United States Patent Office 2,845,145
Patented July 29, 1958

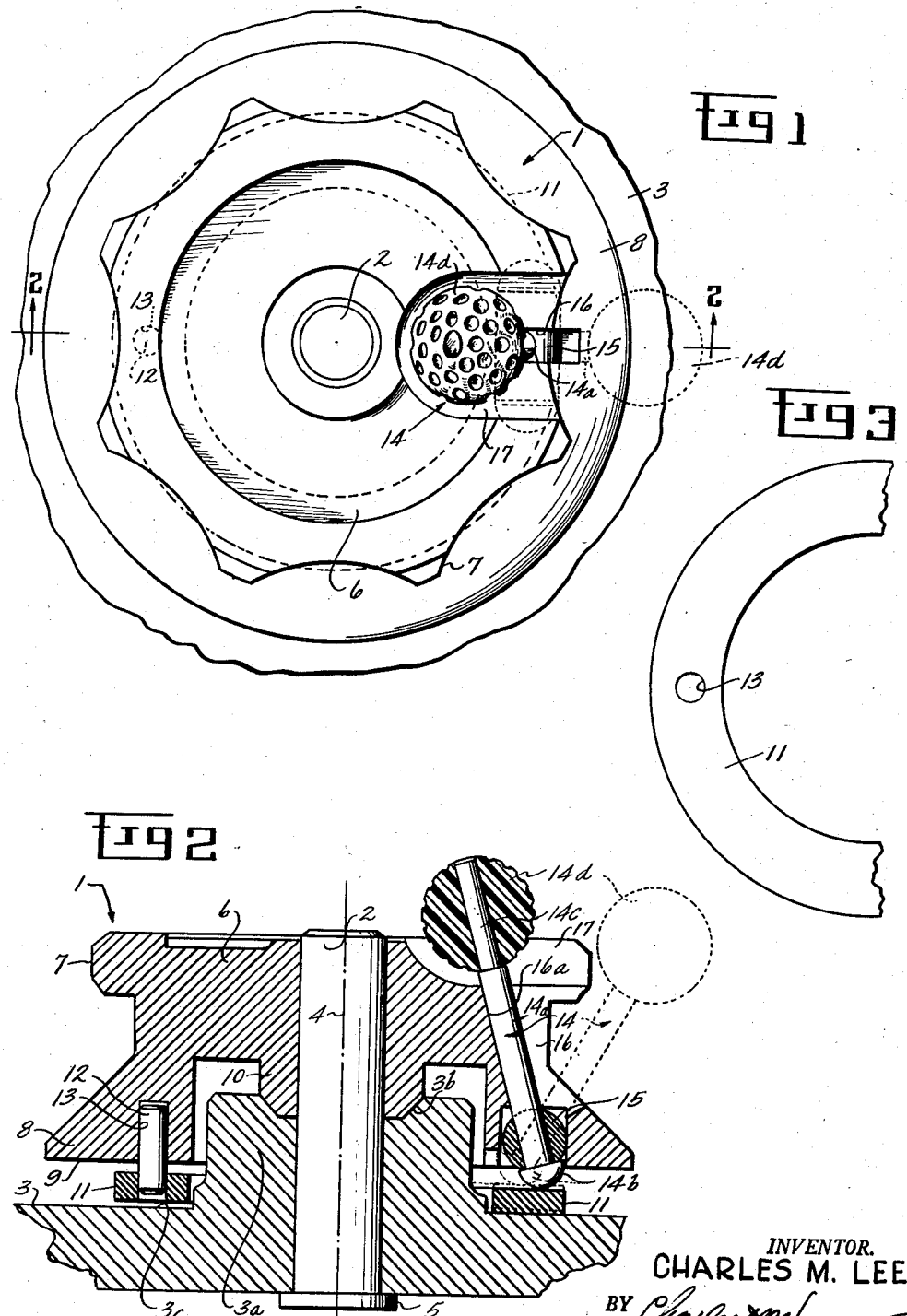
July 29, 1958    C. M. LEE    2,845,145
FRICTION LOCKING DEVICE
Filed Aug. 30, 1954
INVENTOR.
CHARLES M. LEE

2,845,145
FRICTION LOCKING DEVICE

Charles M. Lee, Rochester, N. Y., assignor, by mesne assignments, to the United States of America as represented by the Secretary of the Air Force Application August 30, 1954, Serial No. 453,169

4 Claims. (Cl. 188—71)

This invention relates to a frictional locking means for releasably holding, and preventing accidental rotation of, a manually operable rotary control member, for instance the control knob of an aerial camera lens after it has been set at any desired position, having for an object the provision of a lever operated locking means mounted on or in the control knob in a convenient operative relation for manual actuation thereof by an operator while adjusting the rotative position of the knob.

A further object is the provision of a simple, inexpensive, positive, and easily operated frictional holding or locking device in which the lever directly impinges a brake shoe carried by the control knob, while passing through a dead center position to force the brake shoe into frictional holding engagement with the face of a supporting surface on which the control knob is mounted, including means for limiting the movement of the lever in one direction to slightly beyond dead center to maintain the lever in frictional holding contact and in the opposite direction sufficiently beyond the said dead center position to materially relieve the frictional holding contact between the brake shoe and said surface to permit rotary adjustment of the control knob.

A further object is the provision of a toggle lever actuated frictional holding device in which the lever is movable in a radial plane through the rotary adjustment axis of the control knob past the dead center position for tensioning the brake shoe into frictional holding contact with said supporting surface, and for movement in the opposite direction to swing the lever through said dead center position to a release position, including stop means on the control knob for limiting the movement of the toggle lever past the dead center position at least in the frictional breaking movement thereof.

A further object is the provision of a rotary control member or knob having a brake shoe mounted thereon for axial movement into and out of frictional contact with a portion of the supporting surface surrounding the rotary axis of the control knob, together with toggle lever means mounted for movement in one direction on the control member for camming impingement with the brake shoe on the control knob to move said shoe into frictional holding engagement with the supporting surface, and having a dead center position with the brake shoe in braking position, for holding the brake shoe in said braking position until released by movement of said lever in the opposite direction past said dead center position.

Other objects and advantages of the invention will become apparent from the following description and accompanying drawings in which like reference characters refer to like parts in the several figures.

Drawings

Figure 1 is a plan view in elevation of my improved control knob and locking means, showing the locking lever in locking position in full lines and in release position in dotted lines.

Figure 2 is a transverse sectional view taken approximately on line 2—2 of Figure 1.

Figure 3 is a fragmentary plan view of the brake shoe member.

Specification

Referring to Figures 1 and 2, the reference numeral 1 indicates an adjustable control knob generally incorporating my invention, mounted on a rotatably mounted adjustment shaft or control rod 2 projecting outwardly through a supporting surface 3 with an axis 4 perpendicular to said surface, the control knob 1 being fixed or keyed to the shaft 2 in any suitable manner not shown, such as by set screws, to provide adjustment of the shaft 2 by rotative adjustment of the knob. A collar or flange 5 is fixed on the shaft 2 to prevent outward movement of the shaft 2 relative to the supporting surface 3.

The shaft 2 may be connected to any suitable mechanism to be adjusted in any conventional manner, for instance, rotative adjustment of the shaft 2 by the control knob 1 may be employed to adjust the position or aperture of an aerial photographic lens, not shown.

The control knob, as shown, comprises an annular head portion 6 with a rim 7 to be grasped by the operator and a conical base flange 8, suitably calibrated if desired, the base or inner surface 9 being spaced from a parallel friction or braking surface perpendicular to the axis 4 and concentrically surrounding the adjustment shaft 2.

The supporting surface 3 preferably has an annular boss 3a terminating in a seat 3b for receiving an inwardly projecting hub portion 10, thus limiting inward movement of the knob 1 toward an annular friction surface 3c which surrounds the boss 3a and is located under the flange portion 8.

An annular washer shaped friction plate or brake shoe 11 is interposed as shown in the space between the annular friction surface 3c and the base 9 of the flange 8, being keyed or splined to the control knob 1 by projecting pin 12 from said brake shoe, extending into a complementary receiving opening 13 formed in the flanged portion 8.

A toggle lever member 14 is provided having a central fulcrum or cylindrical pivot portion 15 seated in an elongated pivot receiving recess 16 formed in the base 9, with its pivotal axis located above the inner surface of the brake shoe 11, diametrically opposite the location of the spline or positioning pin 12.

The head 6 is formed with an elongated radial slot 16, flaring at both sides of a plane passing through the pivotal axis of the lever or pivot 15, perpendicular to the back surface of the plate 11, preferably parallel to the axis 4 of the control knob 1. This last mentioned plane establishing a "dead center" position for the toggle camming lever 14 with the slot 16 accommodating and limiting the swinging movements of the camming lever 14 at opposite sides of said "dead center" position, the inner end 16a of the slot 16 limiting movement of the camming lever in one direction to a slight acute angle beyond "dead center" position or its braking position as shown in full lines, while the other or outer end of the slot 16 permits a materially greater swing of the lever across "dead center" to its inoperative or non-braking position, as shown in dotted lines.

The lever 14 comprises a short cylindrical pivot or trunnion member 15 having a bore transversely therethrough through which a lever arm or rod 14a extends formed with a convex camming head or extremity 14b with a stop shoulder limiting movement of head toward the pivot member 15. The lever arm or rod 14a extends through the slot 16 to a point beyond the head 6 of the control member 1 and is concentrically reduced adjacent its outer end at 14c, and a preferably ball shaped roughened, enlarged handle portion 14d is secured thereon, the back of the control knob 1 being formed with an outwardly or radially extending recess 17 to accommodate the swinging movement of the ball shaped handle portion 14d as shown.

The edges of the rim 7 may be cut away, as shown in Figure 1 if desired, to provide more convenient grasping of the rim 7 during swinging movement of the handle member 14c to and from its locking position.

It should be noted that, if desired, the plate or annular brake shoe may be made thinner and more resilient, and rigidly fixed to the under side of the flange portion so as to normally lie in slightly spaced relation to the friction or contact surface 3 under the plate and would therefore normally tend to retain the camming or toggle lever in the inoperated position as shown in dotted lines as well as in its full line position. Swinging the lever past "dead center" to the full line position would then flex the shoe portion thereunder into frictional braking engagement with the supporting surface 3.

The convex head 14b is formed with a substantially spherical curvature and preferably polished to provide for smooth camming movement on the back of the circular washer shaped brake shoe 11. When the lever 14 is moved through the "dead center" position and against the inner end 16a of the slot 16 the camming end 14b is not displaced sufficiently to materially reduce the frictional contact of the brake on the supporting surface 3, and the control knob 1 and shaft are therefore securely held against accidental rotary adjustment. Also, the lever 14 when swung inwardly against the inner end 16a of the slot 16, or at least when swung inwardly to "dead center," or slightly past "dead center" or beyond the perpendicular to the plane of the brake shoe 11, is retained in the braking position as shown in full lines in Figures 1 and 2 until positively and manually swung outwardly materially to the other side of the "dead center," being limited in this outward movement by the other end of the slot 16, when the camming head 14b moved to relieve pressure on and permit disengagement of the brake shoe 11 from the supporting surface 3 and allow free rotary adjustment of the control knob 1.

While one particular embodiment of the invention has been described, it is understood that the invention is not restricted thereto as all modifications are intended to be covered which would be apparent to one skilled in the art and which come within the scope of the appended claims.

I claim:

1. In a toggle lever frictional locking rotary adjustment device, a rotary adjusting member having a central axis, a concentric friction locking plate interengaged for rotation with said member and axially movable thereon toward and away from said rotary member, a toggle lever pivoted for swinging movements in said adjustment member in a radial plane through said central axis toward and away from said axis through a transverse plane perpendicular to said radial plane intersecting said plate parallel to said axis, said lever having a camming extremity at one side of its pivot disposed for camming engagement with said plate during swinging movement of the lever in said radial plane through said transverse plane and an actuating lever arm extending in the opposite direction from the lever pivot terminating in an actuating handle located outwardly away from said plate beyond the rotary member for a convenient manual actuation, said rotary actuating member being radially slotted therethrough outwardly from said lever pivot away from said plate to accommodate predetermined limited radial swinging movement of said lever arm, the radial inner and outer ends of said radial slot forming abutment means for limiting swinging movement of said actuating lever and located at predetermined points at the opposite sides of said transverse plane.

2. In a friction locking device, a rotary control knob adapted to be fixed on a rotary adjustment shaft for rotative adjustment on a plane supporting surface on an axis perpendicular to said surface and having an inner face, circular concentric brake shoe movably fixed to said control knob adjacent said inner face for axial movements into and out of frictional contact with said surface, and located intermediate said surface and said inner face of said control knob, a toggle lever pivotally mounted on said control knob in radially spaced relation to said axis for swinging movements in a radial plane through said axis intersecting said brake shoe to the opposite sides of a dead center position in a second transverse perpendicular intersecting plane parallel to said axis passing through said brake shoe, said lever being pivoted intermediate its ends in said control knob adjacent said inner face and having an inner camming end disposed for camming engagement with said brake shoe during swinging movement of the lever through the dead center position and having an outer elongated actuating arm projecting substantially in the opposite direction beyond said control knob for manual actuation thereof exteriorly of the control knob toward and away from said axis, and stop means formed in said control knob for limiting the degree of swinging movement of the lever at opposite sides of the dead center position.

3. Apparatus as claimed in claim 2 in which an elongated recess spaced radially from said axis and perpendicular to said brake shoe is formed in the inner face of the control knob facing said brake shoe, and the lever is provided with pivot means pivotally seated in the recess, said control knob being formed with an elongated slot therethrough extending radially and outwardly from said recess to accommodate the swing of the actuating arm of said lever, one end of said slot being positioned to limit the swing of the lever toward said axis to a position just past said dead center position to maintain the camming end of the lever in camming engagement with said brake shoe, the other end of said slot being located a greater distance radially outward beyond said dead center position to permit greater swing of said lever in the opposite direction past said dead center position to permit the camming end of said lever to relieve the camming actuation thereof on the brake shoe.

4. In a rotary control knob locking device, a rotary control knob having a central axis and a concentric annular flange portion, having an inner face, and adapted to be fixed on a control shaft in spaced adjacent parallel relation to a plane supporting surface with said control shaft extending therethrough perpendicular to said surface, said inner face adapted to face said plane supporting surface, said knob having a short lever pivot receiving recess formed in said inner face of said flange portion, adapted to face the plane supporting surface and formed with an outwardly diverging elongated radial slot extending outwardly from said recess having one end thereof disposed radially inward of a dead center lever position or relative to a line through the center of the pivot recess parallel to said central axis, the opposite end of said radial slot being disposed at a materially increased radial distance at the opposite side of the dead center position or line aforesaid, an elongated camming lever having a transverse elongated cylindrical pivot part intermediate its ends seated in said pivot receiving recess, said lever having a camming extremity at its inner end adapted to project toward said plane surface, and an outer actuating lever portion extending through and swingable in said radial slot between the said ends thereof, terminating in an enlarged handle extremity located outwardly beyond the exterior of said control knob, an annular concentric brake shoe member connected to said control knob adjacent to said inner face having a braking surface adapted to face, and frictionally engage said plane supporting surface, said brake shoe having an opposite contact surface in the path of movement of the inner camming extremity of the lever, for camming engagement by said camming extremity to move said brake shoe into frictional holding engagement with the plane supporting surface when the camming lever is swung inwardly past said dead center position into contact with the first mentioned end of said radial slot, whereby to hold the brake shoe and lever in braking position to resist rotation of said control knob when the control knob is mounted on the control shaft said inner face of said control knob located adjacent a plane supporting surface through which the control shaft extends and the lever is swung inwardly toward said shaft.

References Cited in the file of this patent

UNITED STATES PATENTS

| | | |
|---|---|---|
| 1,464,980 | Farmer | Aug. 14, 1923 |
| 2,275,286 | Creager | Mar. 3, 1942 |
| 2,408,042 | Butler | Sept. 24, 1946 |

FOREIGN PATENTS

| | | |
|---|---|---|
| 115,201 | Great Britain | May 2, 1918 |
| 668,710 | Great Britain | Mar. 19, 1952 |